United States Patent
Akahori

(10) Patent No.: US 6,959,051 B2
(45) Date of Patent: Oct. 25, 2005

(54) CLOCK REGENERATOR FOR USE IN DEMODULATING DIGITAL MODULATED SIGNALS

(75) Inventor: Hiroji Akahori, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 769 days.

(21) Appl. No.: 09/951,623

(22) Filed: Sep. 14, 2001

(65) Prior Publication Data

US 2002/0048328 A1 Apr. 25, 2002

(30) Foreign Application Priority Data

Sep. 19, 2000 (JP) ........................................ 2000-288886

(51) Int. Cl.⁷ .............................................. H04L 27/06
(52) U.S. Cl. ...................................... 375/340; 375/330
(58) Field of Search ................................... 375/340, 350, 375/261, 355, 329, 330, 331, 332

Primary Examiner—Mohammed Ghayour
Assistant Examiner—Dung X. Nguyen
(74) Attorney, Agent, or Firm—Volentine Francos & Whitt, PLLC

(57) ABSTRACT

A differential detector generates, for each symbol, a phase difference between phase information received from a phase detector and one-symbol-delayed phase information of the received phase information. The one-symbol-delayed phase information is transferred to a differential detector, which generates, for each symbol, a phase difference between the one-symbol-delayed phase information and two-symbol-delayed phase information. The generated phase differences are fed to another differential circuit, which in turn generates, for each symbol, a difference between both received phase differences to produce phase-difference difference information. A clock regenerator circuit extracts symbol timing from the phase-difference difference information and regenerates clock signals synchronizing with the extracted symbol timing.

14 Claims, 9 Drawing Sheets

CLOCK REGENERATOR FOR USE IN DEMODULATING DIGITAL MODULATED SIGNALS

BACKGROUND OF THE INVENTION

1. Field of the Invention

The present invention relates to a clock regenerator. More particularly, in a digital radio transmission system to which PSK (Phase Shift Keying) is applied between a sending digital radio apparatus and a receiving digital radio apparatus, the present invention relates to a clock regenerator applicable to a receiving digital radio apparatus suitable for clock regeneration regardless of frequency error amount (predetermined phase error amount) between a carrier received from the sending digital radio apparatus and a carrier generated in the receiving digital radio apparatus.

2. Description of the Background Art

FIG. 5 shows an example of the functional block of a conventional clock regenerator used in a receiving digital radio apparatus in a digital radio transmission system to which π/4 shift QPSK (Quadrature Phase Shift Keying) is applied between a sending digital radio apparatus and a receiving digital radio apparatus.

The clock regenerator shown in FIG. 5 comprises a phase detector 50, a differential detector 56 composed of a one-symbol delay 52 and a differential circuit 54, a clock regenerator 58, a phase corrector 60, and a phase decision circuit 62. As shown in FIG. 5, the phase detector 50, differential detector 56, and clock regenerator 58 are used in the conventional clock regenerator shown in FIG. 5.

More specifically, as shown in FIG. 5, the conventional clock regenerator uses the phase difference information (differential detection information) generated based on the difference in phase between the current symbol and the immediately-preceding symbol to regenerate or recover clocks.

The operation of the clock regenerator shown in FIG. 5 will be described. The phase detector 50 receives, at its input 200, quadrature detection signals $R(t)=I_R(t), Q_R(t)$, where t is time, the base-band signals generated by quadrature-detecting the received signals. The received analog signals $I_R(t)$ and $Q_R(t)$ are each input to the A/D converters, not shown in the figure, in the phase detector 50. These A/D converters convert the signals to digital i and q signals.

The converted digital signals i and q are input to the $\tan^{-1}(q/i)$ operation circuit, not shown in the figure, in the phase detector 50. The digital signals are converted to $\tan^{-1}(q/i)$ and then to phase information A(t) by this $\tan^{-1}(q/i)$ operation circuit. In the A/D converters described above, the signals are A/D converted at the symbol rate synchronizing with the reception symbol timing signal.

The phase signal A(t) generated by the phase detector 50 is sent to one of the two inputs of the differential circuit 54 on a signal line 202 and to the input of the one-symbol delay 52. The one-symbol delay 52 delays the received phase signal A(t) for one symbol period to generate a one-symbol-delayed phase signal A(t−T), where T is a one-symbol period.

The phase signal A(t−T) generated by the one-symbol delay 52 is input to the other input of the differential circuit 54 on a signal line 204. The differential circuit 54 generates the phase difference between the one-symbol-delayed signal A(t−T) and the received phase signal A(t).

More specifically, from an output 206 and an output 208 of the differential circuit 54, the phase difference information, that is, the phase deviation information $A_T(t)=A(t-T)-A(t)$ is output. This phase deviation information $A_T(t)$ is sent to the phase corrector 60 on the signal line 206. The phase corrector 60 changes the phase deviation information $A_T(t)$ into an absolute phase. The phase deviation information $A_T(t)$ which has been changed into an absolute phase is sent to the phase decision circuit 62 on a signal line 210. The phase decision circuit 62 also receives the symbol timing signal (clock signal) from the clock regenerator 58 on a signal line 214.

The phase decision circuit 62 estimates the transmission phase difference based on the phase deviation information $A_T(t)$, which has been sent from the phase decision circuit 62 changed into an absolute phase, and on the symbol timing signal 214 and demodulates the signal to the data that was sent (in this example, 2-bit data). The data demodulated by this circuit is output to a signal line 212.

The phase deviation information $A_T(t)=A(t-T)-A(t)$ generated by the differential circuit 54 described above is sent also to the clock regenerator 58 on the signal line 208. The clock regenerator 58 extracts the phase extraction timing signal, that is, the symbol timing signal, from the received phase deviation information $A_T(t)$, and regenerates or recovers the clock signal, which synchronizes with this symbol timing signal, from the extracted symbol timing signal. The regenerated clock signal is sent to signal lines 214 and 216.

In this example, the differential circuit 54 subtracts the phase signal A(t) of the immediately-preceding symbol of a one-symbol-delayed phase signal from the one-symbol-delayed phase signal A(t−T). The differential circuit may also subtract the one-symbol-delayed phase signal A(t−T) of a symbol from the phase signal A(t) of the symbol.

The basic operation of the configuration shown in FIG. 5 was described above. The operation of the configuration shown in FIG. 5 will be described more in detail with a preamble pattern, from which the symbol timing signal is easily extracted, as an example.

In such a transmission system, the sending side appends an easily extractable preamble pattern near the start of a sending frame for quick timing signal extraction. In this example, this easily extractable preamble pattern "011001100110. . . " is used. FIG. 6 shows the phase transition of the preamble pattern described above. The phase transition information in FIG. 6 corresponds to the output information from the phase detector 50.

FIG. 7 shows phase transition information on two preamble patterns with the horizontal axis as the time axis. One is phase transition information on the preamble pattern before the one-symbol-delay as plotted with a solid line 401, and the other is phase transition information on the preamble pattern generated by delaying the preamble pattern before the one-symbol-delay for the one-symbol period as plotted with a solid line 403. The former information 401 corresponds to the output information of the phase detector 50, while the latter information 403 to the output information of the one-symbol delay 52.

FIG. 8 shows the phase transition (differential detection) of the preamble pattern 405 that is the difference between the phase transition of the one-symbol-delayed preamble pattern and the phase transition of the preamble pattern before the one-symbol delay. The phase transition 405 corresponds to the output information from the differential circuit 54.

As understood from FIG. 8, the output information of the differential circuit 54 obtained from the preamble pattern is a cyclic or periodic wave with the amplitude of π. The differential circuit 54 sends this cyclic wave with the amplitude of π to the clock regenerator 58. The clock regenerator 58 counts the number of periods T/2 in respect of crossing the center of the amplitude (π/4) of the cyclic wave sent from the clock regenerator 58 to generate the phase extraction timing signal, that is, the symbol timing signal. The circuit generates the clock signal synchronizing with the extracted symbol timing signal.

Actually, however, a carrier frequency phase error is involved between the carrier (transmission frequency) of the sending digital radio apparatus and the carrier of a receiving digital radio apparatus. Therefore, the receiver side finds out a phase error in the carrier frequency. Suppose that the phase error in the carrier frequency is $\alpha+\theta \times t$, where $\alpha$ and $\theta$ are constants. Let $A_T(t)_1$ be the phase deviation information including this phase error. Then, the phase deviation information $A_T(t)_1$ output from the differential circuit 54 is represented by expression (1) as follows:

$$A_T(t)_1=(A(t-T)+\alpha+\theta(t-T))-(A(t)+\alpha+(\theta \times t)) = A(t-T)-A(t)+\theta_1 \quad (1)$$

Because $\theta_1=-\theta \times T$ where T is a one-symbol time, $\theta_1=-\theta$ is a phase deviation error caused by the carrier frequency error between the sending digital radio apparatus and the receiving digital radio apparatus. Note that $\theta_1$ may be represented in radians.

The phase deviation information including the phase deviation error $\theta_1$ is sent to the clock regenerator 58. Therefore, the symbol timing signal generated by the clock regenerator 58 includes the symbol timing error such as the one shown in FIG. 9.

As described above, phase deviation information generated by the conventional clock regenerator shown in FIG. 5 includes a phase deviation error $\theta_1$. This error prevents the clock regenerator from regenerating symbol clocks correctly and from regenerating demodulated data correctly.

SUMMARY OF THE INVENTION

It is therefore an object of the present invention to provide a clock regenerator which solves the drawbacks found in the prior art and which is capable of regenerating clocks regardless of how much frequency error (a fixed amount of phase error) is caused by the carrier between the sending digital radio apparatus and the receiving digital radio apparatus.

The present invention provides a clock regenerator which comprises a phase detector detecting a phase of a received signal and outputting a detection result; a first differential circuit calculating a difference between the detection result and first delay information generated by delaying the detection result for a predetermined period of time and outputting first phase difference information; a second differential circuit calculating a difference between the first delay information and second delay information generated by delaying the first delay information for the predetermined period of time and outputting second phase difference information; a third differential circuit calculating a difference between the first phase difference information and the second phase difference information and outputting third phase difference information; and a clock regenerator circuit extracting a timing signal based on the third phase difference information and generating a clock signal synchronizing with the timing signal.

The present invention also provides, in a digital transmission system comprising a sending digital apparatus sending a frame signal, which includes a preamble pattern composed of a predetermined number of bits each having a predetermined logical value and which is modulated by a digital modulation scheme, and a receiving digital apparatus receiving the modulated signal received from the sending digital apparatus, a clock regenerator for use in the receiving digital apparatus, the clock regenerator comprising: a phase detector receiving a quadrature detection signal which is a baseband signal after a quadrature detection of a modulated signal received from the sending digital apparatus and converting the received quadrature detection signal to first phase information; a first differential circuit calculating, for each symbol, a difference between the first phase information converted by the phase detector and one-symbol-delayed phase information of the first phase information and outputting the difference as first phase difference information; a second differential circuit calculating, for each symbol, a difference between the one-symbol-delayed phase information of the first phase information converted by the phase detector and two-symbol-delayed phase information of the first phase information converted by the phase detector and outputting the difference as second phase difference information; a third differential circuit calculating, for each symbol, a difference between the first phase difference information output by the first differential circuit and the second phase difference information output by the second differential circuit and outputting the difference as phase-difference difference information; and a clock regenerator extracting a symbol timing signal from the phase-difference difference information based on the preamble pattern, the phase-difference difference information being output by the third differential circuit, and regenerating a clock signal synchronizing with the extracted symbol timing signal.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
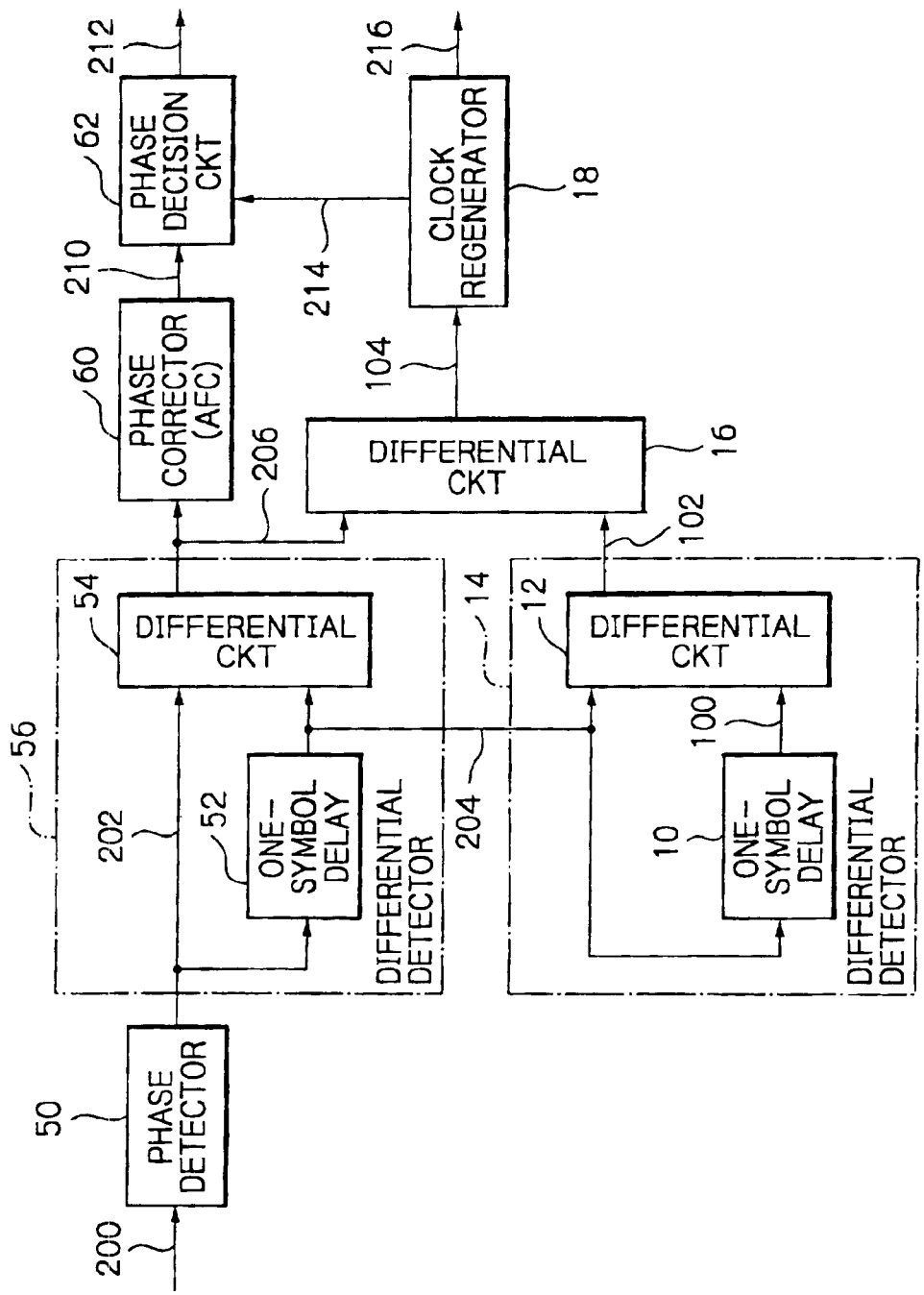
FIG. 1 is a functional block diagram schematically showing a clock regenerator in an embodiment according to the present invention that is applied to a receiving digital radio apparatus.

Referring to the accompanying drawings, some preferred embodiments of a clock regenerator according to the present invention applicable to a receiving digital radio apparatus will be described in detail. FIG. 1 is a functional block diagram of an embodiment of a clock regenerator according to the present invention that is applicable to a receiving digital radio apparatus. Referring to FIG. 1, the clock regenerator comprises a differential detector 14 composed of a one-symbol delay 10 and a differential circuit 12, a differential circuit 16, a clock regenerator 18, a phase detector 50, a differential detector 56 composed of a one-symbol delay 52 and a differential circuit 54, a phase corrector 60, and a phase decision circuit 62. As shown in FIG. 1, the differential detector 14, differential circuit 16, clock regenerator 18, and phase detector 50, and differential detector 56 are used for clock regeneration according to the present invention shown in FIG. 1.

More specifically, the clock regenerator shown in FIG. 1 uses phase-difference difference information 104 for clock regeneration. This information is generated by determining the difference between phase difference information (differential detection information) 206 which is generated by determining the difference between the phase signal of the current symbol and the phase signal of the immediately-preceding symbol of the current symbol and phase difference information (differential detection information) 102 which is generated by determining the difference between the phase signal of the next-immediately-preceding symbol of the current symbol and the phase signal of the immediately-preceding symbol of the current symbol.

Figure 5:
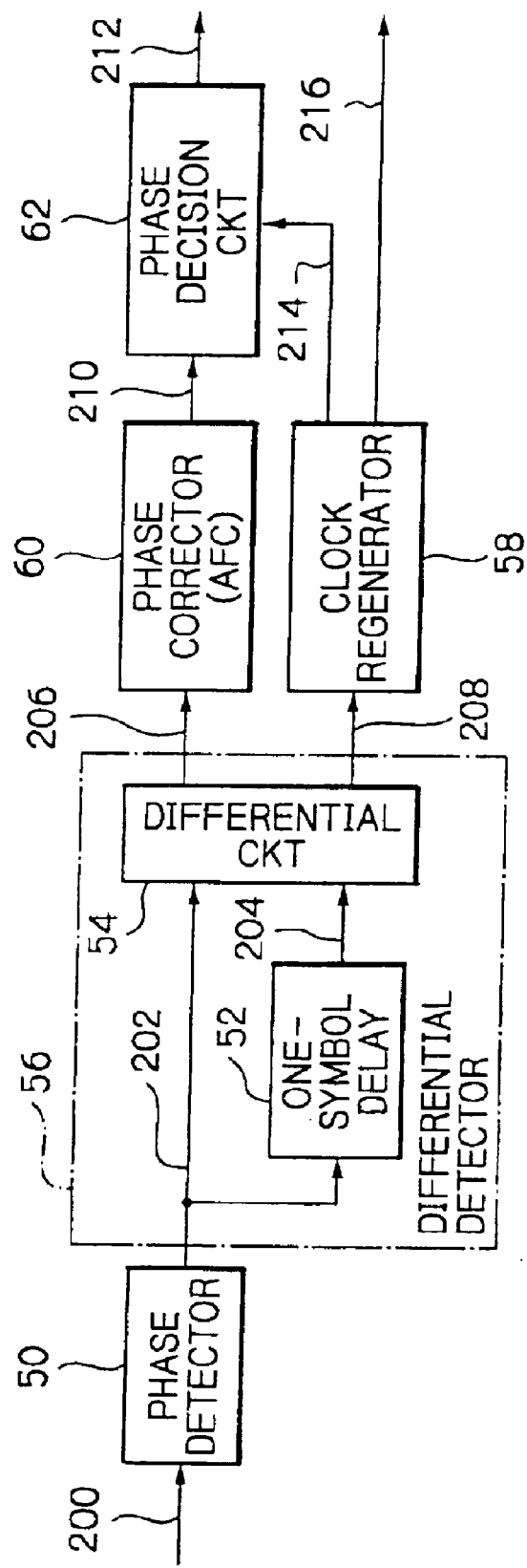
FIG. 5 is a functional block diagram schematically showing an example of a conventional clock regenerator which is applied to a receiving digital radio apparatus.
Figure 6:
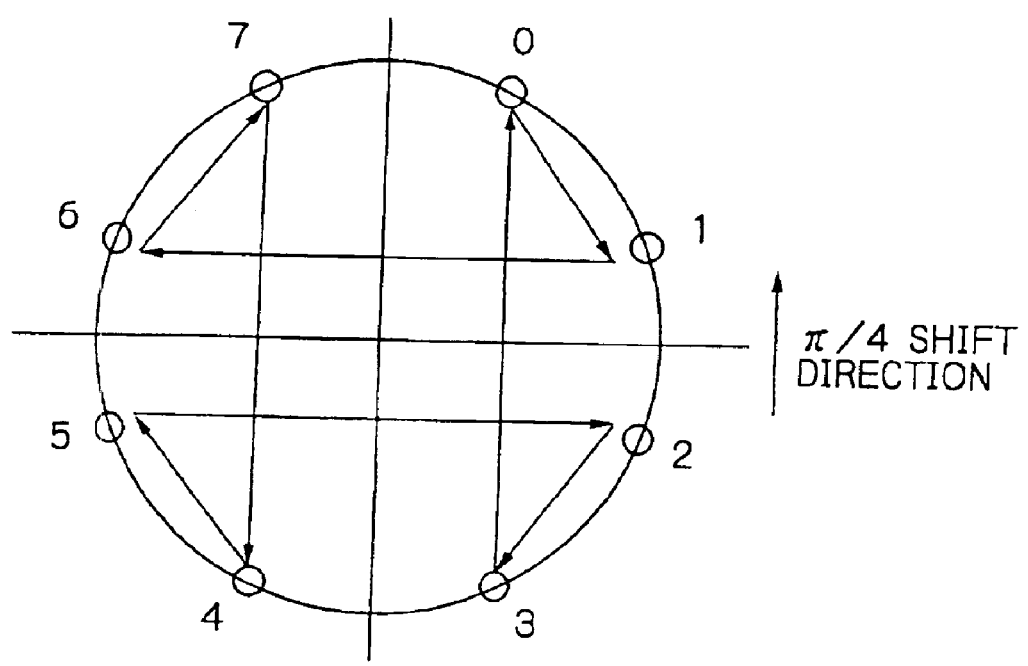
FIG. 6 is a diagram useful for understanding the operation of a conventional clock regenerator shown in FIG. 5 in which the phase deviation of a preamble pattern is shown.
Figure 7:
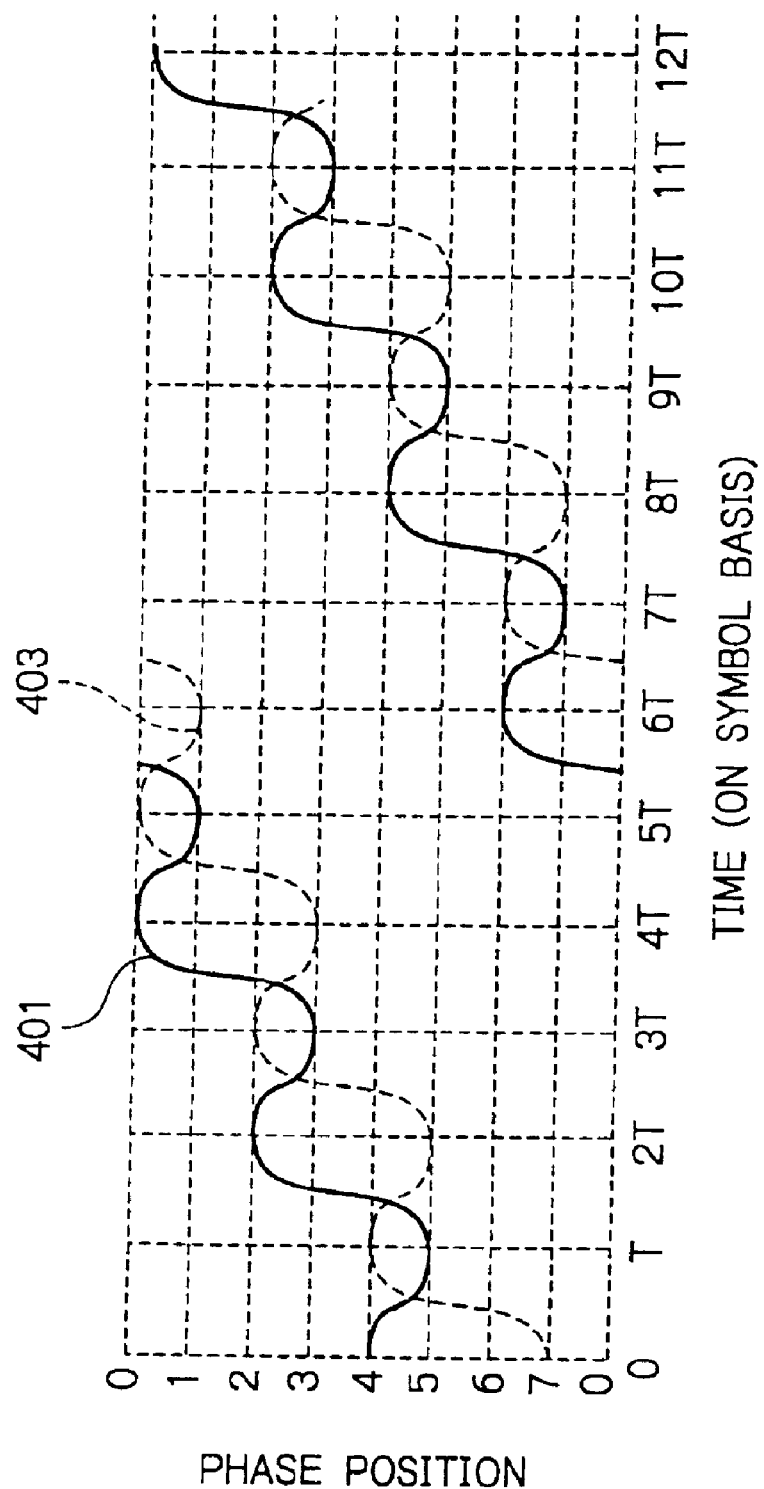
FIG. 7 is a diagram, similar to FIG. 2, useful for understanding the operation of the conventional clock regenerator shown in FIG. 5 in which the phase transition of the current preamble pattern and the phase transition of the one-symbol-delayed preamble pattern are shown.

In FIG. 1, the same reference numerals as those in FIG. 5 represent the basically same functional elements and, therefore, their description is omitted. The clock regenerator shown in FIG. 1 is different in structure from the clock regenerator shown in FIG. 5 specifically in that the differential detector 14 composed of the one-symbol delay 10 and the differential circuit 12 and the differential circuit 16 are added. In addition, in the clock regenerator in FIG. 1, the clock regenerator 18 is replaced for the clock regenerator 58 in FIG. 5.

Because these functional units are added and/or replaced, the connection of the signal lines of the clock regenerator shown in FIG. 1 differs from the connection of the signal lines of the clock regenerator shown in FIG. 5 as described below. The signal line 206 is connected also to one input of the differential circuit 16, the signal line 204 is connected to the input of the one-symbol delay 10 and to one input of the differential circuit 12, the output of the one-symbol delay 10 is connected to the other input of the differential circuit 12 by a signal line 100, the output of the differential circuit 12 is connected to the other input of the differential circuit 16 by a signal line 102, and the output of the differential circuit 16 is connected to the input of the clock regenerator 18 by a signal line 104.

First, the added differential detector 14 and differential circuit 16, and the changed clock regenerator 18 will be described. The differential detector 14 comprises the one-symbol delay 10 and the differential circuit 12 as described above. The phase signal A(t–T) output from the one-symbol delay 52 is input to the input of the one-symbol delay 10 and to one input of the differential circuit 12.

The one-symbol delay 10 is adapted to delay the received one-symbol-delayed phase signal A(t–T) for another one symbol period and outputs the delayed phase signal A(t–2T). This phase signal A(t–2T) is sent to the other input of the differential circuit 12 on the signal line 100.

The differential circuit 12 is adapted to generate the difference between the received phase signal A(t–2T) and the received phase signal A(t–T). More specifically, the phase difference information, that is, the phase deviation information $A_{2T}(t)=A(t-2T)-A(t-T)$, is output from the output 102 of the differential circuit 12. The phase deviation information $A_{2T}(t)$ obtained from the differential circuit 12 is sent to one input of the differential circuit 16 on the signal line 102.

The phase deviation information $A_T(t)=A(t-T)-A(t)$ obtained from the differential circuit 54 is sent to the other input of the differential circuit 16 on the signal line 206. The differential circuit 16 generates the difference between the received phase deviation information $A_{2T}(t)$ and the received phase deviation information $A_T(t)$. Specifically, phase-difference difference information, that is, phase deviation difference information $B(t)=A_{2T}(t)-A_T(t)$ is output from the output 104 of the differential circuit 16. The phase deviation difference information $$B(t)=A_{2T}(t)-A_T(t)=A(t-2T)-2A(t-T)+A(t)$$

obtained from the differential circuit 16 is sent to the clock regenerator 18 on the signal line 104.

The clock regenerator 18 extracts the symbol timing signal from the received phase deviation difference information B(t) and regenerates or restores the clock signal, synchronizing with the symbol timing signal, from the extracted symbol timing signal. This regenerated clock signal is sent to the signal lines 214 and 216.

In this example, the differential circuit 12 subtracts the phase signal A(t–T) of the immediately-preceding symbol of a two-symbol-delayed phase signal from the two-symbol-delayed phase signal A(t–2T). The differential circuit may also subtract the one-symbol-delayed phase signal A(t–2T) of an immediately-preceding symbol from the phase signal A(t–T) of the immediately-preceding symbol. The same applies also to the differential circuit 16.

It is assumed in the above description that there is no error between the carrier of the sending digital radio apparatus and the carrier of the receiving digital radio apparatus when a preamble pattern in the bit configuration described above is applied. Actually, however, there is an error between the carrier of the sending digital radio apparatus and the carrier of the receiving digital radio apparatus as described above. Therefore, the receiving side finds out a carrier frequency phase error, that is, a carrier phase error of α+θ×t, where α and θ are constants. The variation in the carrier phase error value generated by this carrier frequency error is so small that it may be ignored.

Next, the operation of the major functional units that is performed when a carrier frequency phase error occurs will be described. When such a phase error is included, the phase deviation information $A_T(t)_1$ output from the differential circuit 54 is defined by expression (1) above. The phase deviation information $A_{2T}(t)_1$ output from the differential circuit 12 is defined by expression (2) below.

$$A_{2T}(t)_1 = (A(t-2T) + \alpha + \theta \times (t-2T)) - (A(t-T) + \alpha + \theta \times (t-T)) \quad (2)$$
$$= A(t-2T) - A(t-T) + \theta \times (t-2T) - \theta \times (t-T)$$

The phase deviation difference information $B(t)_1$ output from the differential circuit 16 is defined by expression (3) below.

$$B(t)_1 = A_{2T}(t)_1 - A_T(t)_1 \quad (3)$$
$$= (A(t-2T) - A(t-T) + \theta \times (t-2T) - \theta \times (t-T)) -$$
$$(A(t-T) - A(t) + \theta \times (t-T) - (\theta \times t))$$
$$= A(t-2T) - 2A(t-T) + A(t) + (\theta \times (t-2T) - \theta \times (t-T)) -$$
$$(\theta \times (t-T) - (\theta \times t))$$
$$= A(t-2T) - 2A(t-T) + A(t) + \theta_2$$

As described above, the variation in the carrier phase error value generated by a carrier frequency error is so small that it may be ignored. Therefore, $\theta_2=(\theta \times (t-2T)-\theta \times (t-T))-(\theta \times (t-T)-(\theta \times t))$. The phase deviation error $\theta \times (t-2T)-\theta \times (t-T)$ and the phase deviation error $\theta \times (t-T)-(\theta \times t)$ may be regarded as the same value as each other. Therefore, it may be said that $\theta_2=0$. Thus, the phase deviation difference information $B(t)_1$ output from the differential circuit 16 is the value from which a carrier frequency error has been removed.

Figure 2:
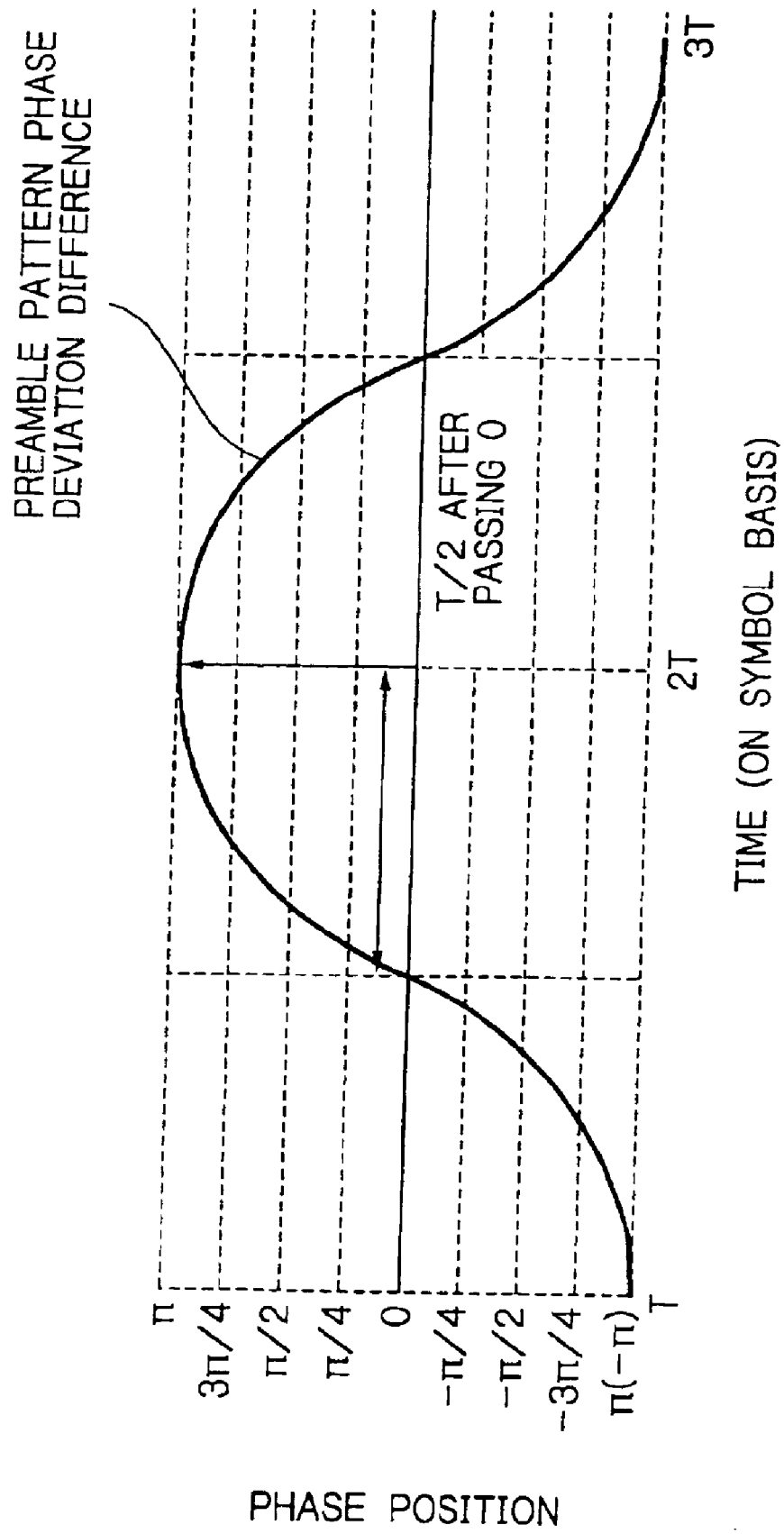
FIG. 2 is a diagram useful for understanding the operation of the clock regenerator according to the present invention shown in FIG. 1 in which symbol timing signals are extracted from phase deviation signals of a preamble pattern.

The phase deviation difference information not including the error $\theta_2$ in the phase deviation difference is sent to the clock regenerator 18. Therefore, the clock regenerator 18 uses the transition of the received phase divination difference. For example, in the preamble pattern, the phase deviation value after T/2 has elapsed from the phase deviation value of "0" is "π". This timing is the symbol timing, see FIG. 2.

More specifically, the clock regenerator 18 counts the number of periods T/2 based on the center "0" of the amplitude of the periodic wave sent from the clock regenerator 18 to generate the phase extraction timing signal, that is, the symbol timing signal, and generates the clock signal, synchronizing with the symbol timing signal, from the extracted symbol timing signal.

The clock regenerator according to the instant embodiment can thus regenerate clocks regardless of the amount of frequency error (amount of predetermined phase error) of the carrier between the sending digital radio apparatus and the receiving digital radio apparatus.

Figure 3:
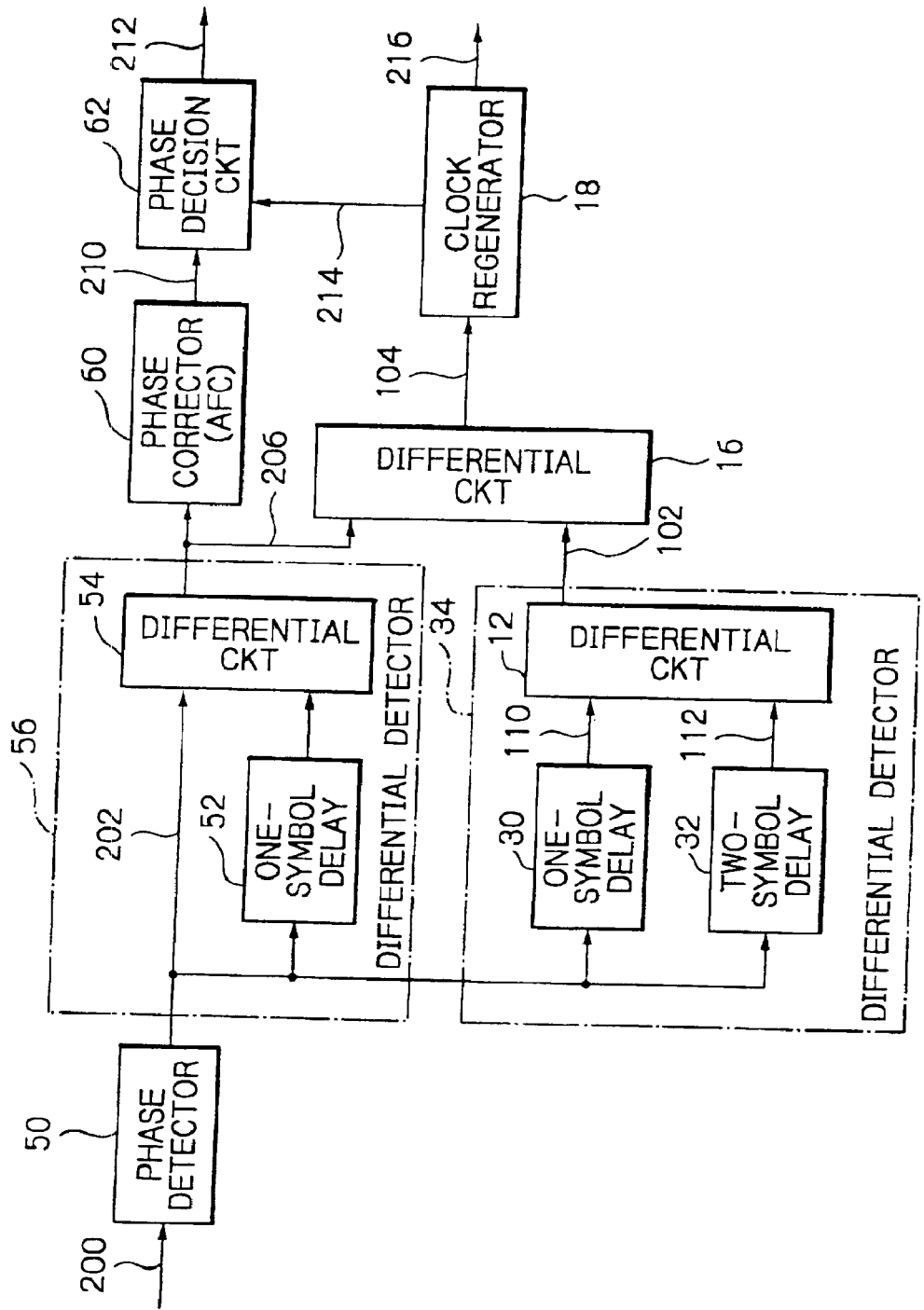
FIG. 3 is a functional block diagram, like FIG. 1, schematically showing a clock regenerator in an alternative embodiment according to the present invention that is applied to a receiving digital radio apparatus.

FIG. 3 is a functional block diagram showing an alternative embodiment of a clock regenerator according to the present invention applicable to a receiving digital radio apparatus. Referring to FIG. 3, the clock regenerator comprises a differential detector 34 comprising a one-symbol delay 30, a two-symbol delay 32, and the differential circuit 12, the differential circuit 16, the clock regenerator 18, the phase detector 50, the differential detector 56 comprising the one-symbol delay 52 and the differential circuit 54, the phase corrector 60, and the phase decision circuit 62. As shown in FIG. 3, the differential detector 34, differential circuit 16, clock regenerator 18, phase detector 50, and differential detector 56 are used for clock regeneration according to the present invention that is shown in FIG. 3.

As shown in FIG. 3, the circuit configuration of the clock regenerator in FIG. 3 is basically the same as that of the clock regenerator shown in FIG. 1 and therefore the description of the clock regenerator shown in FIG. 3 is omitted.

Figure 4:
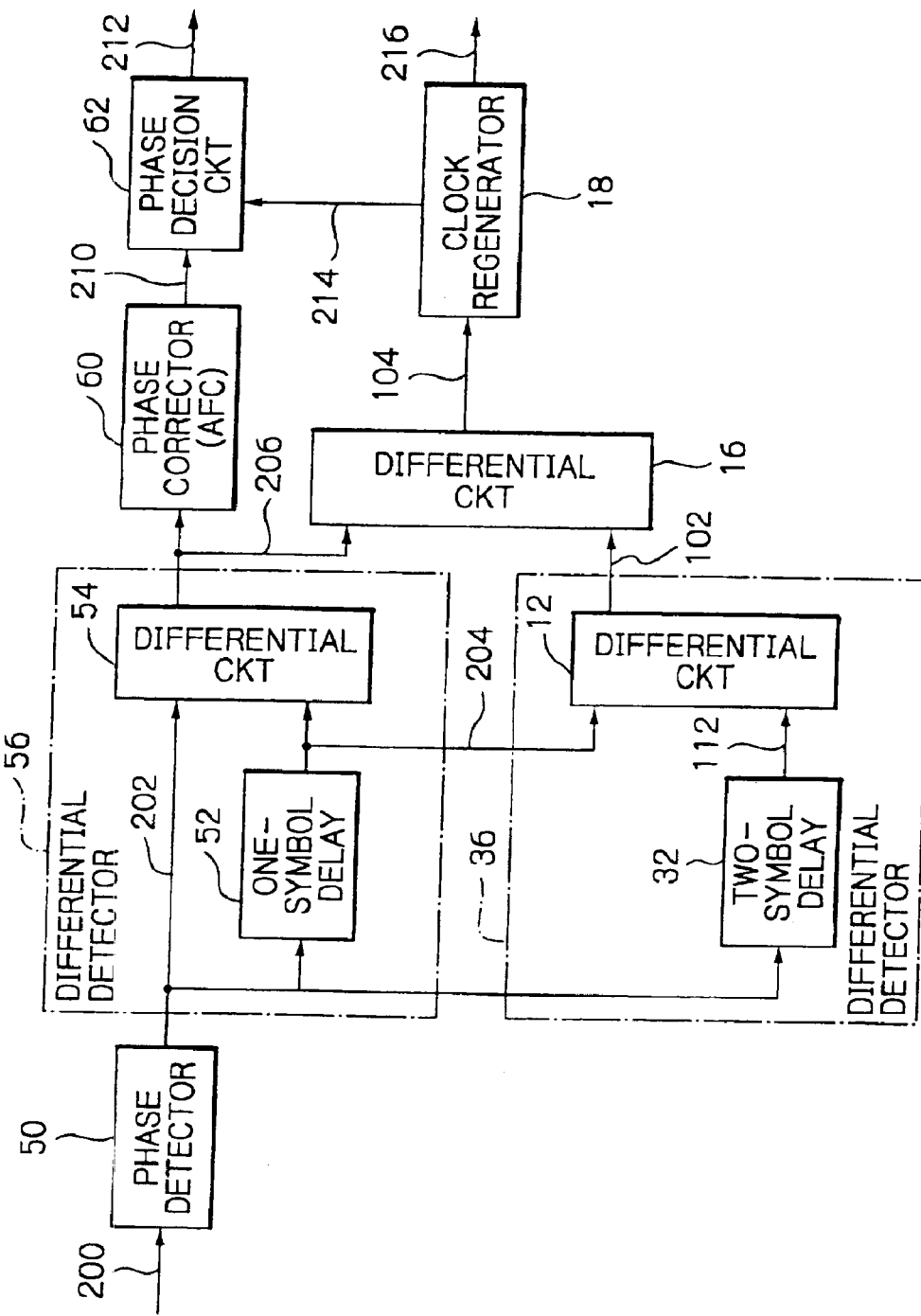
FIG. 4 is a functional block diagram, like FIG. 1, schematically showing a clock regenerator in a further alternative embodiment according to the present invention that is applied to a receiving digital radio apparatus.

FIG. 4 is a functional block diagram showing a further alternative embodiment of a clock regenerator according to the present invention applicable to a receiving digital radio apparatus. Referring to FIG. 4, the clock regenerator comprises a differential detector 36 comprising the two-symbol delay 32 and the differential circuit 12, the differential circuit 16, the clock regenerator 18, the phase detector 50, the differential detector 56 comprising the one-symbol delay 52 and the differential circuit 54, the phase corrector 60, and the phase decision circuit 62. As shown in FIG. 4, the differential detector 36, differential circuit 16, clock regenerator 18, phase detector 50, and differential detector 56 are used for clock regeneration according to the present invention that is shown in FIG. 4.

As shown in FIG. 4, the circuit configuration of the clock regenerator in FIG. 4 is basically the same as that of the clock regenerator shown in FIG. 1 and therefore the description of the clock regenerator shown in FIG. 4 is omitted.

Figure 8:
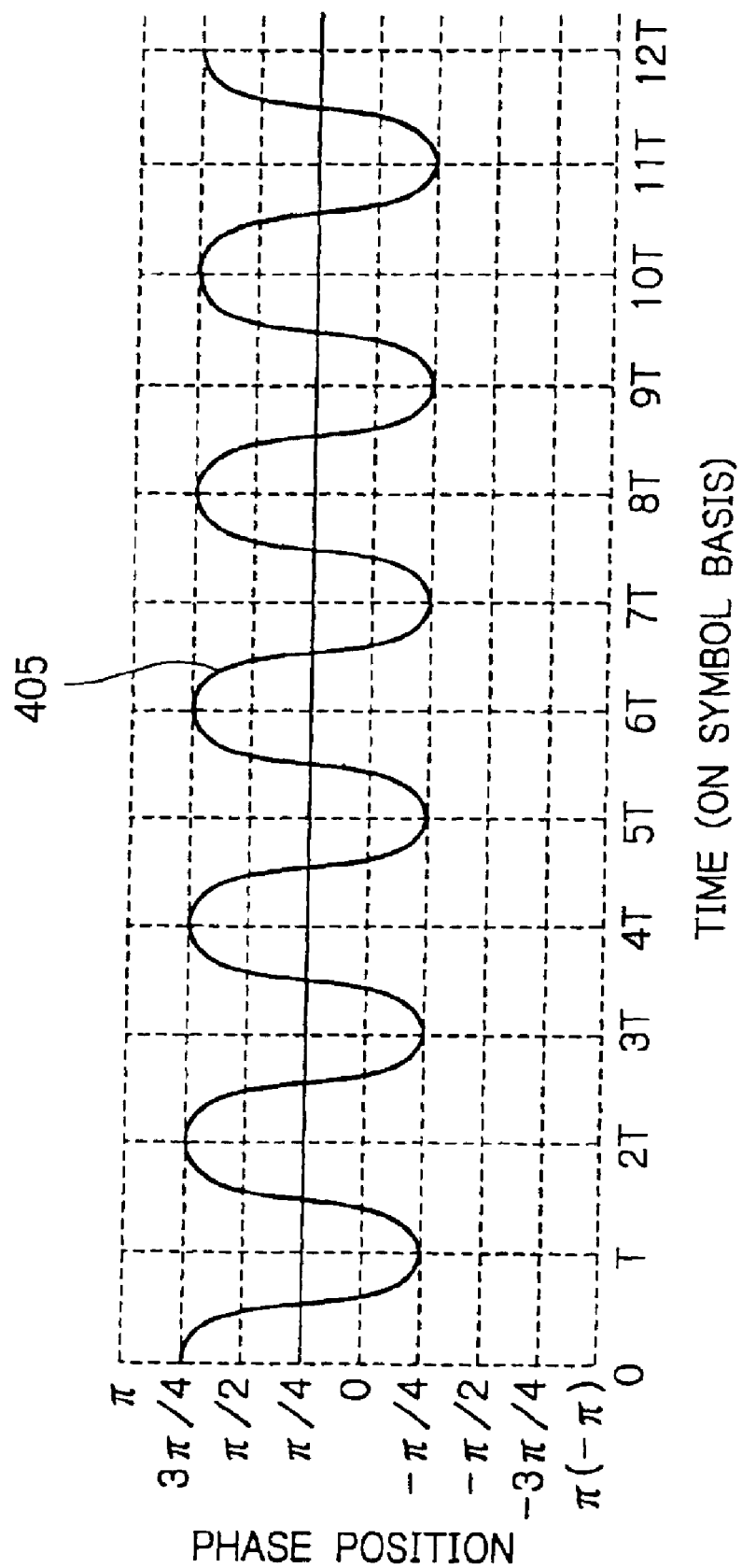
FIG. 8 is a diagram, similar to FIG. 2, useful for understanding the operation of the conventional clock regenerator shown in FIG. 5 in which the phase transition based on the difference between preamble patterns before and after one-symbol-delay is shown.
Figure 9:
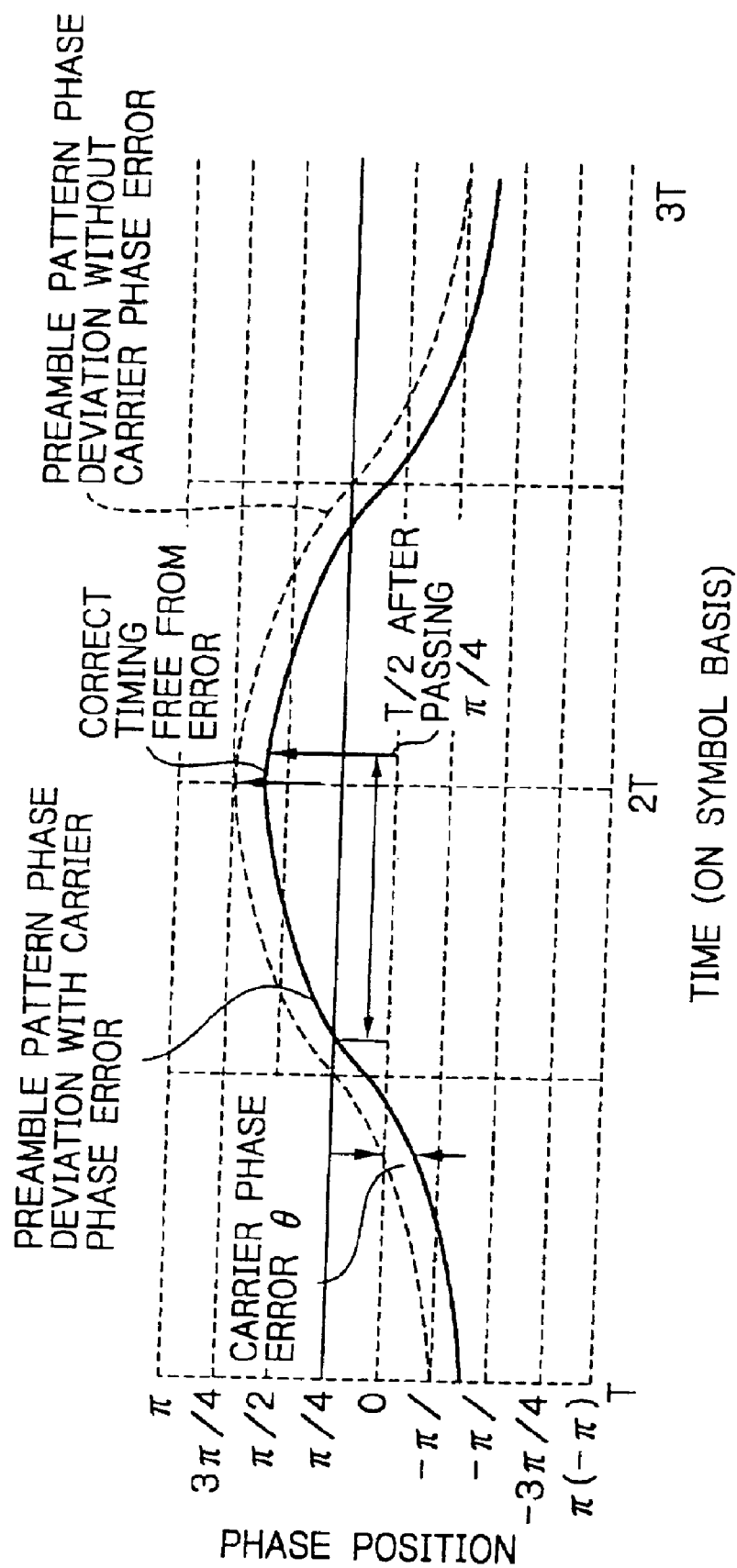
FIG. 9 is a diagram, similar to FIG. 2, useful for understanding the operation of the conventional clock regenerator shown in FIG. 5 in which a symbol timing error generated by a carrier phase error in the phase deviation of a preamble pattern is shown.

In those three embodiments, the preamble pattern with the bit configuration described above is used. A preamble pattern with the bit configuration, except the preamble pattern with the bit configuration whose phase transition is the one shown in FIG. 8, allows error-free symbol timing signals to be extracted.

Further in those three embodiments, the clock regenerator used in a receiving digital radio apparatus in a digital radio transmission system in which a sending digital radio apparatus and a receiving digital radio apparatus are connected on a radio connection is described. The present invention is applicable also to a clock regenerator in a receiving digital wired apparatus in a digital wire transmission system in which a sending digital wire apparatus and a receiving digital wire apparatus are connected by wire.

The clock regenerator according to the illustrative embodiments comprises a phase detector detecting a phase of a received signal and outputting a detection result; a first differential circuit calculating a difference between the detection result and first delay information generated by delaying the detection result for a predetermined time and outputting first phase difference information; a second differential circuit calculating a difference between the first delay information and second delay information generated by delaying the first delay information for the predetermined time and outputting second phase difference information; a third differential circuit calculating a difference between the first phase difference information and the second phase difference information and outputting third phase difference information; and a clock regenerator extracting a timing signal based on the third phase difference information and generating a clock signal synchronizing with the timing signal.

The clock regenerator with this configuration does not include a frequency error (a predetermined amount of phase error) in the third phase difference information output from the third differential circuit, allowing the clock regenerator to regenerate clock signals without errors.

In addition, in a digital transmission system comprising a sending digital apparatus sending a frame signal, which includes a preamble pattern composed of a predetermined number of bits each having a predetermined logical value and which is modulated by a digital modulation scheme, and a receiving digital apparatus receiving the modulated signal received from the sending digital apparatus, the clock regenerator according to the embodiments for use in the receiving digital apparatus comprises a phase detector receiving a quadrature detection signal which is a base-band signal after a quadrature detection of a modulated signal received from the sending digital apparatus and converting the received quadrature detection signal to phase information A; a first differential circuit calculating, for each symbol, a difference between the phase information A converted by the phase detector and one-symbol-delayed phase information of the phase information A and outputting the difference as first phase difference information; a second differential circuit calculating, for each symbol, a difference between the one-symbol-delayed phase information of the phase information A converted by the phase detector and two-symbol-delayed phase information of the phase information A converted by the phase detector and outputting the difference as second phase difference information; a third differential circuit calculating, for each symbol, a difference between the first phase difference information output by the first differential circuit and the second phase difference information output by the second differential circuit and outputting the difference as phase-difference difference information B; and a clock regenerator extracting a symbol timing signal from the phase-difference difference information B based on the preamble pattern, the phase-difference difference information B being output by the third differential circuit, and regenerating a clock signal synchronizing with the extracted symbol timing signal.

The clock regenerator with this configuration does not include a frequency error (a predetermined amount of phase error) which is caused by the carrier between the sending digital apparatus and the receiving digital apparatus, in the phase-difference difference information B output from the third differential circuit, allowing the clock regenerator to regenerate clock signals without errors.

The entire disclosure of Japanese patent application No. 2000-288886 filed on Sep. 19, 2000 including the specification, claims, accompanying drawings and abstract of the disclosure is incorporated herein by reference in its entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A clock regenerator comprising:
    a phase detector receiving a signal and detecting a phase of the received signal to output a detection result representative of the detected phase;
    a first differential circuit calculating a difference between the detection result and first delay information formed by delaying the detection result for a first predetermined period of time to output first phase difference information;
    a second differential circuit calculating a difference between the first delay information and second delay information resultant from delaying the detection result for a second period of time which is twice as long as the first predetermined period of time to output second phase difference information;
    a third differential circuit calculating a difference between the first phase difference information and the second phase difference information to output third phase difference information; and
    a clock regenerator circuit extracting a timing signal on a basis of the third phase difference information and generating a clock signal synchronizing with the timing signal.

2. The clock regenerator according to claim 1 wherein the received signal is a base-band signal to which a frame signal modulated by a $\pi/4$ shift QPSK (Quadrature Phase Shift Keying) is demodulated, the frame signal including a preamble pattern composed of a predetermined number of bits each having a predetermined logical value.

3. The clock regenerator according to claim 1 wherein said second differential circuit comprises a delay circuit delaying the first delay information for the first period of time to form the second delay information.

4. The clock regenerator according to claim 1 wherein said second differential circuit comprises a first delay circuit delaying the detection result for the first period of time to form the first delay information, and a second delay circuit delaying the detection result for the second period of time to form the second delay information.

5. The clock regenerator according to claim 1 wherein said second differential circuit comprises a delay circuit delaying the detection result for the second period of time to form the second delay information.

6. A clock regenerator for use in a receiver digital apparatus in a digital transmission system for receiving a frame signal transmitted from a sender digital apparatus, the frame signal including a preamble pattern composed of a predetermined number of bits each having a predetermined logical value and being modulated by a digital modulation scheme, the receiver digital apparatus quadrature-detecting the modulated signal transmitted from the sender digital apparatus into a quadrature detection signal in a form of base-band signal, said clock regenerator comprising:
    a phase detector receiving the quadrature detection signal and detecting a phase of the received quadrature detection signal to form first phase information representative of the detected phase;
    a first differential circuit calculating, for each symbol, a difference between the first phase information and one-symbol-delayed phase information of the first phase information to output the difference as first phase difference information;
    a second differential circuit calculating, for each symbol, a difference between the one-symbol-delayed phase information and two-symbol-delayed phase information of the first phase information to output the difference as second phase difference information;
    a third differential circuit calculating, for each symbol, a difference between the first phase difference information and the second phase difference information to output the difference as phase-difference difference information; and
    a clock regenerator extracting a symbol timing from the phase-difference difference information on a basis of the preamble pattern, and regenerating a clock signal synchronizing with the extracted symbol timing.

7. The clock regenerator according to claim 6 wherein the digital modulation scheme is $\pi/4$ shift QPSK (Quadrature Phase Shift Keying).

8. A method of regenerating a clock signal comprising the steps of:
    receiving an input signal and detecting a phase of the received signal to form a detection result representative of the detected phase;
    delaying the detection result for a predetermined period of time to form first delay information;
    calculating a difference between the detection result and the first delay information to form first phase difference information;

forming second delay information resultant from delaying the detection result for a period of time which is twice as long as the predetermined period of time;

calculating a difference between the first delay information and the second delay information to form second phase difference information;

calculating a difference between the first phase difference information and the second phase difference information to form third phase difference information; and extracting a timing signal on a basis of the third phase difference information and generating a clock signal synchronizing with the timing signal.

9. The method according to claim 5 further comprising the step of preparing as the input signal a base-band signal to which a frame signal modulated by a π/4 shift QPSK (Quadrature Phase Shift Keying) is demodulated, the frame signal including a preamble pattern composed of a predetermined number of bits each having a predetermined logical value.

10. The method according to claim 8 wherein said step of forming the second delay information comprises the step of delaying the first delay information for the first period of time to form the second delay information.

11. The method according to claim 8 wherein said step of forming the second delay information comprises the steps of delaying the detection result for the first period of time to form the first delay information, and delaying the detection result for the second period of time to form the second delay information.

12. The method according to claim 8 wherein said step of forming the second delay information comprises the step of delaying the detection result for the second period of time to form the second delay information.

13. A method of regenerating a clock signal in a receiver digital apparatus in a digital transmission system, comprising the steps of:

receiving a frame signal transmitted from a sender digital apparatus, the frame signal including a preamble pattern composed of a predetermined number of bits each having a predetermined logical value and being modulated by a digital modulation scheme;

quadrature-detecting the modulated signal transmitted from the sender digital apparatus into a quadrature detection signal in a form of base-band signal;

detecting a phase of the quadrature detection signal and forming first phase information representative of the detected phase;

delaying the first phase information by one symbol period of time to form one-symbol-delayed phase information;

calculating, for each symbol, a difference between the first phase information and the one-symbol-delayed phase information to form first phase difference information;

forming two-symbol-delayed phase information resultant from delaying the first phase information by two symbol periods of time;

calculating, for each symbol, a difference between the one-symbol-delayed phase information and the two-symbol-delayed phase information to form second phase difference information;

calculating, for each symbol, a difference between the first phase difference information and the second phase difference information to form phase-difference difference information; and extracting a symbol timing from the phase-difference difference information on a basis of the preamble pattern, and regenerating a clock signal synchronizing with the extracted symbol timing.

14. The method according to claim 13 wherein the digital modulation scheme is π/4 shift QPSK (Quadrature Phase Shift Keying).

* * * * *